US011592578B2

(12) United States Patent
Turunen

(10) Patent No.: US 11,592,578 B2
(45) Date of Patent: Feb. 28, 2023

(54) GNSS RECEIVER PROTECTION LEVELS

(71) Applicant: u-blox AG, Thalwil (CH)

(72) Inventor: Seppo Turunen, Tampere (FI)

(73) Assignee: u-blox AG, Thalwil (CH)

(*) Notice: Subject to any disclaimer, the term of this patent is extended or adjusted under 35 U.S.C. 154(b) by 143 days.

(21) Appl. No.: 16/475,351

(22) PCT Filed: Dec. 30, 2016

(86) PCT No.: PCT/EP2016/082931
§ 371 (c)(1),
(2) Date: Jul. 1, 2019

(87) PCT Pub. No.: WO2018/121879
PCT Pub. Date: Jul. 5, 2018

(65) Prior Publication Data
US 2019/0339396 A1    Nov. 7, 2019

(51) Int. Cl.
G01S 19/39        (2010.01)
G01S 19/26        (2010.01)
G01S 19/20        (2010.01)
G01S 19/08        (2010.01)
G01S 19/44        (2010.01)
G01S 19/22        (2010.01)

(52) U.S. Cl.
CPC .............. G01S 19/39 (2013.01); G01S 19/20 (2013.01); G01S 19/26 (2013.01); G01S 19/08 (2013.01); G01S 19/22 (2013.01); G01S 19/44 (2013.01)

(58) Field of Classification Search
CPC .......... G01S 19/20; G01S 19/08; G01S 19/44; G01S 19/39; G01S 19/26

USPC ............ 342/357.65, 357.58, 357.45, 357.27
See application file for complete search history.

(56) References Cited

U.S. PATENT DOCUMENTS 6,204,806 B1    3/2001 Hoech
7,023,381 B2*   4/2006 Zimmerman ......... G01S 19/071
                                                342/464
(Continued)

FOREIGN PATENT DOCUMENTS

EP    2523014 A1 * 11/2012 ............. G01S 19/39
EP    2523014 A1    11/2012
EP    3009860 A1    4/2016

OTHER PUBLICATIONS

International Search Report and Written Opinion dated Sep. 5, 2017 in international Application No. PCT/EP2016/082931.

Primary Examiner — Erin F Heard
Assistant Examiner — Michael W Justice
(74) Attorney, Agent, or Firm — Finnegan, Henderson, Farabow, Garrett & Dunner, L.L.P.

(57) ABSTRACT

A method of determining a posterior error probability distribution for a parameter measured by a Global Navigation Satellite System (GNSS) receiver. The method comprises receiving a value for each of one or more GNSS measurement quality indicators associated with the GNSS measurement of the parameter. The or each received measurement quality indicator value is provided as an input into a multivariate probability distribution model to determine the posterior error probability distribution for the GNSS measurement, wherein the variates of the multivariate probability distribution model comprise error for said parameter, and the or each measurement quality indicator.

18 Claims, 5 Drawing Sheets

(56) References Cited

U.S. PATENT DOCUMENTS

| | | | | |
|---|---|---|---|---|
| 7,894,983 B2* | 2/2011 | Krach | | G01S 19/22 340/995.25 |
| 8,265,202 B2* | 9/2012 | Lentmaier | | G01S 19/37 375/148 |
| 8,471,764 B2* | 6/2013 | Krach | | G01S 19/37 375/148 |
| 8,629,805 B2* | 1/2014 | Pulford | | G01S 19/20 342/357.58 |
| 8,878,722 B2* | 11/2014 | Revol | | G01S 19/53 342/357.35 |
| 8,981,992 B2* | 3/2015 | Riley | | G01S 19/20 342/357.23 |
| 9,062,978 B2* | 6/2015 | Win | | G01C 21/165 |
| 9,322,919 B2* | 4/2016 | Iwasaki | | G01S 19/08 |
| 9,516,621 B2* | 12/2016 | Bialer | | G01S 5/0273 |
| 9,602,974 B2* | 3/2017 | Rudow | | G01S 5/16 |
| 9,743,373 B2* | 8/2017 | Rudow | | H04W 4/029 |
| 9,880,286 B2* | 1/2018 | Rudow | | G01S 19/49 |
| 9,910,158 B2* | 3/2018 | Rudow | | G01S 19/07 |
| 10,082,580 B2* | 9/2018 | Ben-Moshe | | H04K 3/90 |
| 10,254,412 B2* | 4/2019 | Navarro Madrid | | G01S 19/393 |
| 10,365,363 B2* | 7/2019 | Rohr | | G01S 5/0263 |
| 10,527,716 B2* | 1/2020 | Stein | | G01S 13/72 |
| 10,866,324 B2* | 12/2020 | Jardak | | G01S 19/29 |
| 2003/0058163 A1* | 3/2003 | Zimmerman | | G01S 19/41 342/464 |
| 2004/0021603 A1* | 2/2004 | Zimmerman | | G01S 19/41 342/450 |
| 2004/0071196 A1* | 4/2004 | Marsden | | G01S 19/30 375/147 |
| 2006/0074558 A1 | 4/2006 | Williamson et al. | | |
| 2008/0154487 A1* | 6/2008 | Krach | | G01S 19/22 701/535 |
| 2009/0074038 A1* | 3/2009 | Lentmaier | | G01S 19/37 342/357.77 |
| 2011/0084878 A1* | 4/2011 | Riley | | G01S 19/20 342/357.58 |
| 2011/0291887 A1* | 12/2011 | Pulford | | G01S 19/20 342/357.58 |
| 2012/0146851 A1* | 6/2012 | Fernandez | | G01S 19/02 342/357.58 |
| 2012/0212369 A1* | 8/2012 | Revol | | G01P 21/025 342/357.35 |
| 2012/0310591 A1* | 12/2012 | Win | | G01S 19/47 702/150 |
| 2013/0127661 A1* | 5/2013 | Iwasaki | | G01S 19/08 342/357.45 |
| 2013/0218397 A1* | 8/2013 | Griffini | | G01C 21/165 701/26 |
| 2013/0262032 A1* | 10/2013 | Ide | | G01S 19/34 702/181 |
| 2014/0240170 A1* | 8/2014 | Rudow | | G01S 19/07 342/357.42 |
| 2014/0253375 A1* | 9/2014 | Rudow | | G01S 19/49 342/357.51 |
| 2014/0378170 A1* | 12/2014 | Rudow | | G01S 19/35 455/456.6 |
| 2014/0378171 A1* | 12/2014 | Rudow | | H04W 4/029 455/456.6 |
| 2015/0282112 A1* | 10/2015 | Bialer | | G01S 5/0273 455/456.1 |
| 2016/0109579 A1* | 4/2016 | Navarro Madrid | | G01S 19/393 342/357.62 |
| 2016/0349362 A1* | 12/2016 | Rohr | | G01S 5/0263 |
| 2016/0349373 A1* | 12/2016 | Ben-Moshe | | G01S 19/215 |
| 2016/0377729 A1* | 12/2016 | Jardak | | G01S 19/30 342/357.27 |
| 2018/0246195 A1* | 8/2018 | Stein | | G01S 19/42 |
| 2018/0252818 A1* | 9/2018 | Sato | | G01S 19/08 |
| 2019/0120632 A1* | 4/2019 | Daikoku | | G08G 1/0969 |

* cited by examiner

GNSS RECEIVER PROTECTION LEVELS

CLAIM FOR PRIORITY

This application is a U.S. national phase entry under 35 U.S.C. § 371 of PCT International Application No. PCT/EP2016/082931, filed Dec. 30, 2016, of which this application claims priority, which is incorporated herein by reference.

TECHNICAL FIELD

The present invention relates to a method for obtaining the posterior error probability distribution for a measurement made by a Global Navigation Satellite System (GNSS) receiver and a method for obtaining a multivariate probability distribution model mapping measurement error of a GNSS receiver to one or more indicators of GNSS measurement quality. The invention also relates to a navigation system or a module thereof, the system or module being for estimating the posterior error probability distribution in a GNSS measurement.

BACKGROUND

Global Navigation Satellite System (GNSS) receivers enable the accurate determination of user position by performing ranging measurements on radio frequency (RF) signals transmitted by at least four GNSS satellites. The distance to each satellite is determined by first measuring the time it takes for the RF signal to travel from the satellite to the receiver and then this travel time is converted into a corresponding "line-of-sight" distance by multiplying it with the speed of light.

Ranging measurements performed on the pseudorandom noise (PRN) code modulated onto the satellite signal's RF carrier (hereafter carrier) are known as pseudorange measurements and can achieve positioning accuracy in the region of metres if biases and error sources are appropriately taken into account. However, it is also possible to perform ranging measurements on the carrier of the satellite signal rather than on the 'modulated' signal. These measurements, known as carrier phase or carrier range measurements, can be made with extremely high precision and can thus achieve centimetre positioning accuracy if biases and errors are correctly accounted for. Many modern GNSS receivers perform both types of measurements to increase the accuracy of the position determination. In some cases, a GNSS receiver may utilise measurements made using a plurality of satellite constellations, i.e. a plurality of global navigation satellite systems. Whilst the discussion which follows refers only to the use of a single GNSS, one skilled in the art will appreciate the use of multiple systems is not excluded.

In many applications of GNSS it is important to quantify the error associated with a GNSS measurement. For example, in autonomous driving applications, it is crucial for the ADAS to determine when the uncertainty in the position of a vehicle becomes too large in order to avoid dangerous or incorrect navigation instructions being provided to the vehicle. In such a case, the ADAS controlling the vehicle may be forced to rely on other sensors to determine the position of the vehicle and/or to return full control to the driver.

One source of error in GNSS measurements arises from GNSS signal distortion. Signal distortion may be caused by, for example, the following processes occurring individually or in combination: obstructions between the satellite and the GNSS receiver, which may e.g. cause a temporary loss of lock in a carrier phase measurement; reflections, which may increase the time it takes for a signal to reach the receiver; or multipath propagation, in which interference is produced as a result of signals reaching the receiver by two or more paths. Such signal distortion errors may depend strongly on the environment surrounding the GNSS receiver and can be particularly pronounced in built-up areas. Signal distortion is therefore a significant source of error for GNSS receivers which are used in urban environments, e.g. GNSS receivers belonging to advanced driver assistance systems (ADASs).

In handling errors, the concept of an "alert limit" is used. The alert limit, or alarm limit as it is sometimes called, for a given parameter measurement is the error tolerance not to be exceeded without issuing an alert or alarm. For a given system parameter, the alert limit may be fixed and be chosen according to the maximum acceptable measurement errors. The concept of "integrity risk" is also well-established in safety critical applications of GNSS measurements such as civil aviation and is the probability that, at any moment, the position error exceeds the alert limit. Integrity risk identifies the level of trust in the accuracy of information that is supplied by a navigation system and will of course vary over time.

The uncertainty or error associated with a position measurement along a particular direction can be quantified in terms of a "protection level" associated with that direction. This is defined as being a statistical bound error computed so as to guarantee that the probability of the absolute position error exceeding said number is smaller than or equal to the target integrity risk. The protection level may commonly be provided in the form of a radius, in which case, the protection level defines a radial bound or circle in which there is a high probability in which the vehicle is expected to be found. A protection level may be defined with respect to a particular value of the integrity risk or, conversely, a fixed protection level may be used to determine an integrity risk.

The protection level can be used to determine when to alert a user of a navigation system that the navigation system is unable to provide a sufficiently precise position estimate for the user. For example, if an alert limit is set to a radius of 2 metres and the protection level associated with a position measurement is calculated to be a radius of 5 metres, an alarm can be triggered so that the user of the navigation system may take some corrective action. If the protection level does not exceed the alert limit then the system and user can be confident that the navigation system will report the position with the required level of precision, with a high degree of certainty; in other words, the width of the probability distribution for the expected error in the reported position is not too large. However, because the error in each reported position varies randomly, there remains a small risk that any particular position reported by the navigation system differs from the true position of the user by a distance which exceeds the alert limit. Such an undetected event is referred to here as an "integrity breach".

The probability that each particular position reported by the navigation system will lead to an integrity breach can be calculated from the probability distribution for the error in the reported position by integrating the area under the tail of the probability distribution which lies outside the alert limit. From these probabilities, the number of integrity breaches which are expected to occur within a given period of time, i.e. the integrity risk, can be calculated. For example, if the navigation system reports positions at a rate of 10 Hz, and for each position there is a $10^{-5}$ chance that the error (but not the protection level) exceeds the alert limit, the risk of an integrity breach is $10^{-4}$ per second.

When designing a system, typical integrity requirements may be as follows:

Integrity risk: $10^{-4}$ integrity breach/second
Alert limit for cross track protection level: 5 m
Alert limit for along track protection level: 10 m
Fault tolerant time interval: 5 s The fault tolerant time interval is the expected time-span before a hazardous event occurs following a fault in the navigation system.

Approaches for calculating integrity risk are known from the civil aviation industry and include, for example, modelling the error distribution for position measurements using a stationary Gaussian distribution, or the types of processes discussed above. However, as these approaches are typically concerned with addressing errors associated with the GNSS satellites, they may fail to adequately account for the effects of signal distortion or errors associated with the GNSS receiver. In particular, by assuming that only a single satellite is producing an erroneous measurement at a given time, many known approaches are ill-suited to situations in which signal distortion causes errors in multiple satellite signals simultaneously. As a consequence of these kinds of problems, the known approaches for calculating integrity risk may be less reliable when used for road vehicles. One approach for calculating integrity risk, which has been proposed for use with road vehicles, uses a Least Squares (LS) algorithm to estimate a position based on several position measurements and calculates a protection level using the LS residuals.

There is therefore a need for improved methods and systems for calculating integrity risk which are suitable for use with, for example, vehicles other than aircraft.

SUMMARY OF THE INVENTION

According to a first aspect of the present invention there is provided a method of determining a posterior error probability distribution for a parameter measured by a Global Navigation Satellite System (GNSS) receiver. The method comprises receiving a value for each of one or more GNSS measurement quality indicators associated with the GNSS measurement of the parameter. The or each received measurement quality indicator value is provided as an input into a multivariate probability distribution model to determine the posterior error probability distribution for the GNSS measurement, wherein the variates of the multivariate probability distribution model comprise error for said parameter, and the or each measurement quality indicator.

The multivariate probability distribution model may be a multivariate probability distribution function, the method comprising marginalising the multivariate probability distribution function with respect to the measurement quality indicator(s) to obtain a marginal probability distribution function. The multivariate probability distribution function is then normalised using the marginal probability distribution function to obtain a conditional probability distribution.

One or more of the measurement quality indicator(s) may be indicative of signal distortion of one or more GNSS satellite signals received by the GNSS receiver. One or more of the measurement quality indicator(s) may be derived from one or more GNSS satellite signals received by the GNSS receiver. In this case, the GNSS measurement quality indicator(s) may comprise one or more of: carrier-to-noise density, carrier-to-noise density variability, carrier phase variance, multipath deviation, loss-of-lock detection, code lock time and phase lock time, satellite elevation, and satellite azimuth. One or more of the measurement quality indicator(s) are determined from measurements made by one or more sensors.

In a specific embodiment, the parameter measured by the GNSS receiver is a GNSS range measurement.

The parameter measured by the GNSS receiver may comprise a pseudorange, Doppler and/or carrier phase measurement.

The method may comprise using the posterior error probability distribution for the measured GNSS parameter to estimate a probability distribution for the uncertainty in a position of the GNSS receiver and, optionally, using the posterior error probability distribution for the uncertainty in the position of the GNSS receiver to calculate a protection level.

The step of determining the posterior error probability distribution for the measured GNSS parameter may comprise using one or more GNSS measurement quality indicators associated with a previous GNSS parameter measurement.

According to a second aspect of the present invention there is provided a method of obtaining a multivariate probability distribution model, the variates of the multivariate probability distribution comprising error for a parameter measured by a Global Navigation Satellite System (GNSS) receiver and one or more GNSS measurement quality indicators. The method comprises collecting a value for each of the GNSS measurement quality indicators for a plurality of different geographic locations, and, for each geographic location:

receiving a GNSS measurement of the parameter;
receiving a reference measurement of the parameter;
comparing the GNSS measurement of the parameter with the reference measurement of the parameter to obtain an error in the GNSS measurement of the parameter; and
determining the multivariate probability distribution model from the GNSS measurement errors and the GNSS measurement quality indicator values.

In certain embodiments, the GNSS receiver is attached to or housed within a vehicle such as a car, bus, lorry, etc.

In the case of a road-going vehicle, the plurality of geographic locations may comprise a plurality of different road types and-or driving environments traversed by the vehicle.

According to a third aspect of the present invention there is provided a module for a navigation system comprising an interface sub-module for receiving a value for each of one or more measurement quality indicators associated with a Global Navigation Satellite System (GNSS) measurement of a parameter. The module further comprises a memory storing a multivariate probability distribution model, the variates of the multivariate probability distribution comprising error for the measured GNSS parameter and the or each GNSS measurement quality indicator, and a processor coupled to the memory and the interface sub-module, the processor configured to determine a posterior error probability distribution for the measured GNSS parameter by inputting the or each received measurement quality indicator value into the multivariate probability distribution model.

In this module, the multivariate probability distribution model stored in the memory may be obtained according to the method of the above second aspect of the invention.

According to a fourth aspect of the present invention there is provided a Global Navigation Satellite System (GNSS) receiver comprising the module of the above third aspect of the invention.

According to a fifth aspect of the present invention there is provided an autonomous driving system for controlling the motion of a vehicle, the system comprising the module of the above third aspect of the invention.

According to a sixth aspect of the present invention there is provided an advanced driver assistance system (ADAS) for assisting a driver in controlling a vehicle, the ADAS comprising the module of claim the above third aspect of the invention.

According to a seventh aspect of the present invention there is provided a vehicle comprising the autonomous driving system of the above fifth aspect of the invention or the advanced driver assistance system of the above sixth aspect of the invention. Such a vehicle may comprise one or more sensors for determining one or more of the measurement quality indicators.

BRIEF DESCRIPTION OF THE DRAWINGS

Some preferred embodiments of the invention will now be described by way of example only and with reference to the accompanying drawings, in which.

DETAILED DESCRIPTION

Figure 1:
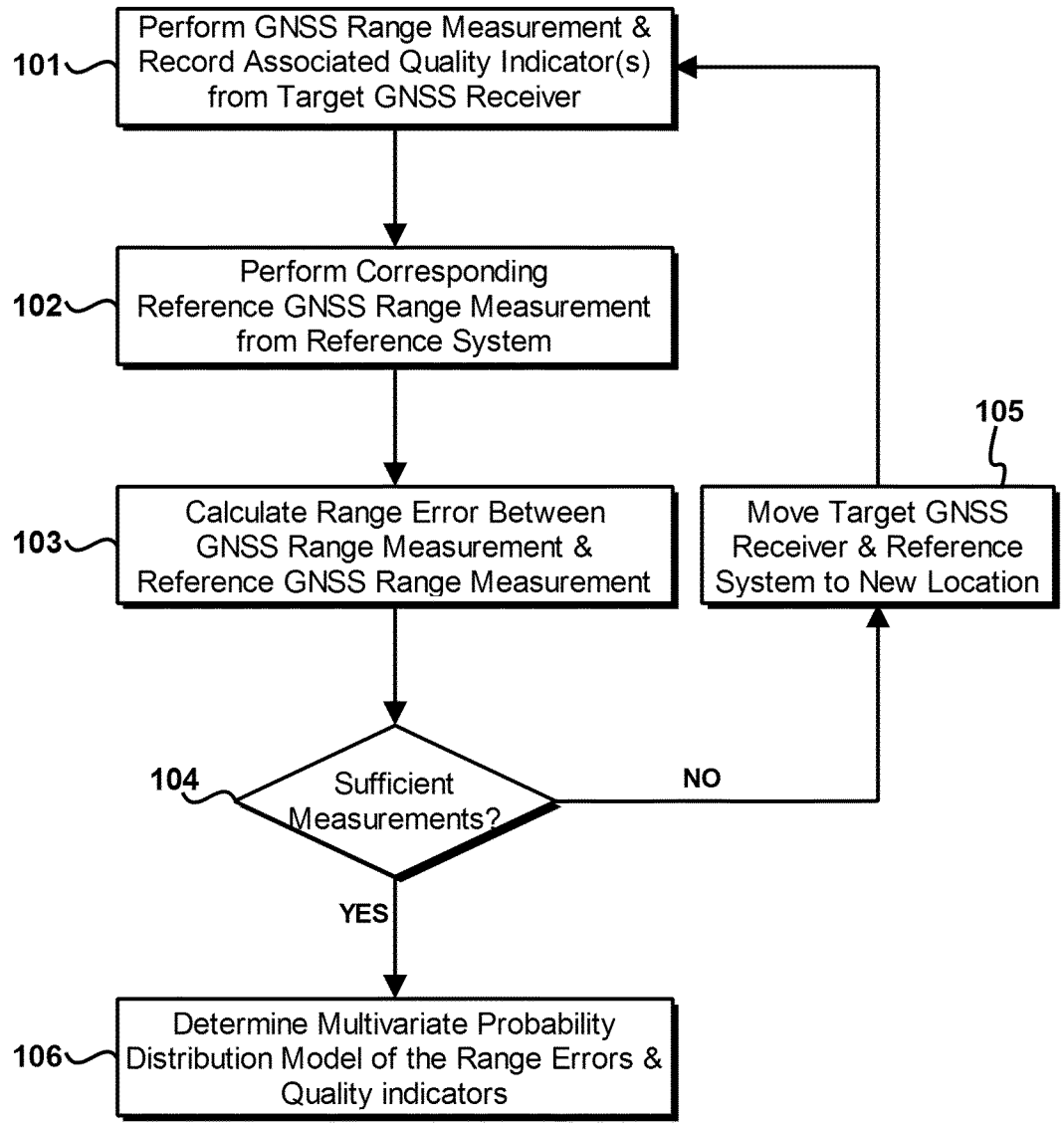
FIG. 1 is a flow chart illustrating a method of obtaining a multivariate probability distribution for the measurement error of a GNSS receiver according to an embodiment of the invention.

FIG. 1 is a flow chart illustrating the steps of a measurement campaign to determine a multivariate probability distribution model between the measurement error of a GNSS receiver and one or more indicators of GNSS measurement quality.

A GNSS receiver is typically able to make measurements including pseudorange and carrier-phase measurements, based on the signals it receives from the satellites in the GNSS. In addition to these measurements, the GNSS receiver may additionally provide measurement quality indicators, which may include signal parameters and/or performance indicators. Examples of signal parameters include carrier-to-noise ratio or density ($C/N_0$), carrier-to-noise ratio variability, an estimate of the carrier phase and pseudorange variances as well as multipath deviation. Examples of performance indicators include loss-of-lock (cycle slip) detectors and counters for code lock time and phase lock time. The accuracy of GNSS measurements made by a GNSS receiver may be correlated with one or more measurement quality indicators. For example, there may be a large expected error in a range measurement if the carrier-to-noise density for one or more of the GNSS satellite signals is low or if the multipath deviation of the signal is large. The statistical relationship between the error associated with a type of GNSS measurement and one or more measurement quality indicators can be described in terms of a multivariate probability distribution model.

In a first step 101 of the method, a target GNSS receiver is used to make a GNSS range measurement. One or more measurement quality indicators associated with the range measurement are recorded. The GNSS range measurement may comprise a pseudorange or carrier range measurement. Multiple GNSS ranging measurements may be made in the same location from a plurality of satellite signals and for each of these measurements the associated measurement quality indicator(s) are also recorded. The measurement quality indicator(s) provide information about the measurement quality of the environment in which the GNSS range measurement is made; for example, the carrier-to-noise density of a satellite signal received in the particular location.

Next, a reference system, e.g. a reference GNSS receiver, is used 102 to determine a "truth" or reference GNSS range measurement at the location in which the target GNSS receiver made the aforementioned measurement(s). The reference system should be capable of providing a more accurate GNSS range measurement than the target GNSS receiver and may be, for example, a Precise Point Positioning (PPP) receiver or a GNSS receiver for use in surveying. The reference GNSS range measurement is used in step 103 to calculate the error in the range measurement provided by the target GNSS receiver.

In order to obtain a multivariate probability distribution model mapping the GNSS measurements to one or more measurement quality indicators, steps 101-103 are repeated for a range of different measurement quality environments, i.e. different locations, and data collection is only terminated (by the decision process 104) when sufficient measurements have been made. The different measurement quality environments should be similar to the environments in which the target GNSS receiver is typically used or will be used. For example, if the target GNSS receiver is to be used in an ADAS, then steps 101-103 may be performed for the types of road for which the ADAS is intended to operate. A different measurement quality environment may be obtained in step 105 by moving the target GNSS receiver to a new location.

The requirement for extremely low integrity risk in many applications may mean that measurements for many different measurement quality environments are needed to obtain the multivariate probability distribution model with high accuracy. In particular, as the measurement quality environments that are needed to estimate the tails of the multivariate distribution may be scarce, it may be necessary to employ techniques such as importance sampling to obtain better statistical coverage. For example, for ADAS applications it may be necessary to include a disproportionate number of range measurements for roads in which there are large measurement errors and subsequently correct the statistics numerically afterwards. On the other hand, for some applications it may not be necessary to obtain an accurate estimation for the tails of the multivariate probability distribution model for values of the measurement error which exceed a cut-off value. This cut-off value may, for example, be a measurement error for which a feasibility check based on measurements from other sensors associated with the navigation system are known to capture and isolate errors with a high certainty.

In step 106, the multivariate distribution model is determined from the range errors and the measurement quality indicator data. Estimation of the distribution may be done parametrically, by fitting a standard distribution to the measured data or it may be done empirically, without making assumptions about the shape of the distribution, for example, using multivariate kernel density estimators. Other examples of non-parametric representations include the Edgeworth series and the Gram-Charlier series. It is also possible to use a copula decomposition to represent the multivariate cumulative probability distribution function (CDF) in terms of univariate marginal distribution functions. This latter approach may simplify numerical operations requiring integration of the multivariate CDF as the integration bounds are limited to a unit hypercube rather than extending to infinity for one or more of the integration variables.

Considering this latter approach in more detail, the univariate CDF of a random variable $X_k$ is the empirically derived estimate:

$$F_k^n(x) = \frac{1}{n}\sum_{i=1}^{n} 1(X_k^i \leq x)$$

calculated from n observations of the variable $X_k^i$. The univariate estimate can be extended to a multivariate estimate by considering the multivariate CDF of $X_k^i$ as being decomposed into $$F(x_1, \ldots, x_n) = C(F_1(x_1), \ldots, F_n(x_n))$$

Where the Copula C is a function of n random variables defined on the unit hypercube $[0,1]^n$. If we define a random vector $$U_1^i, U_2^i, \ldots, U_d^i = F_1^n(X_1^i), F_2^n(X_2^i), \ldots, F_d^n(X_d^i),$$
$$i=1, \ldots, n$$

The Copula can be estimated as $$C^n(u_1, \ldots, u_d) = \frac{1}{n}\sum_{i=1}^{n} 1(U_1^i \leq u_1, \ldots, U_d^i \leq u_d)$$

Which defines the joint cumulative distribution function of $U_1, U_2, \ldots, U_d$.

The method illustrated in FIG. 1 is not limited to range measurements and other types of GNSS measurements such as Doppler measurements may be used.

Figure 2:
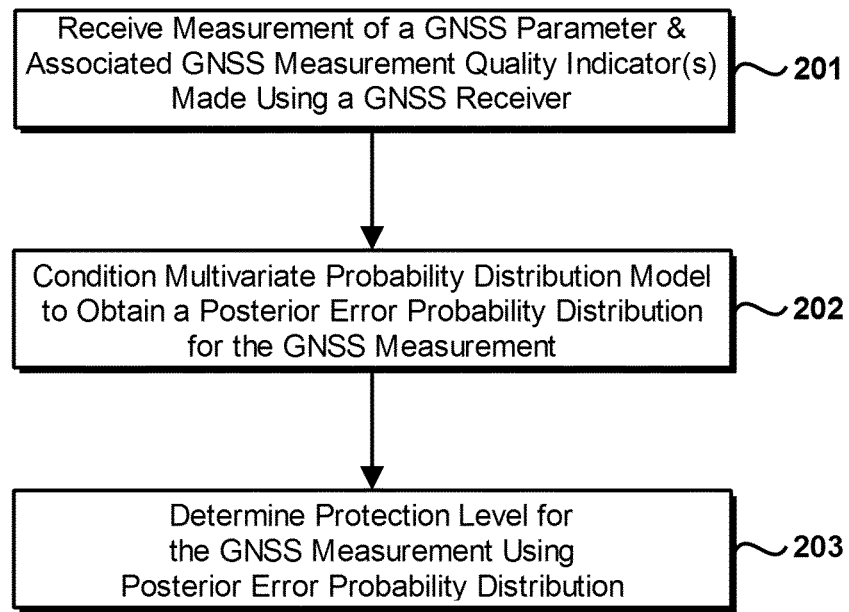
FIG. 2 is a flow chart illustrating a method of estimating the measurement error in a measurement made by a GNSS receiver according to an embodiment of the invention.

FIG. 2 is a flow chart illustrating a method of estimating the posterior error probability distribution for a GNSS measurement made by a GNSS receiver. It is preferable that the GNSS receiver is similar to, or the same type or model as, the target GNSS receiver used to obtain the multivariate probability distribution as described with reference to FIG. 1. In step 201, the GNSS measurement, e.g. a range measurement, and data relating to one or more indicators of GNSS measurement quality associated with the measurement are received. In step 202, the data relating to the indicator(s) is used to condition a multivariate probability distribution model to obtain a posterior error probability distribution for the measurement error. At step 203, the posterior error probability distribution is used to determine the protection level for the measurement.

Navigation systems may apply navigation filters such as Least Square (LS) algorithms or Kalman filters in order to produce more accurate position estimates which take into account the previous and current data available to the navigation system. The posterior error probability distribution for the measurement obtained according to the steps described above may be used as an additional input into the navigation system to increase the accuracy or "trustworthiness" of the predictions obtained using the navigation filters. Advantageously, as the navigation filters may be linear with respect to measurement errors, the coefficients obtained from the navigation filter may be applied to the posterior error probability distribution for the measurement in order to update a previous estimate of a position error. The most recent distribution of errors in the position coordinates may then be used to determine abscissae corresponding to the tail probability of maximum allowable integrity risk, the abscissae being the protection levels associated with different values of the integrity risk.

Figure 3:
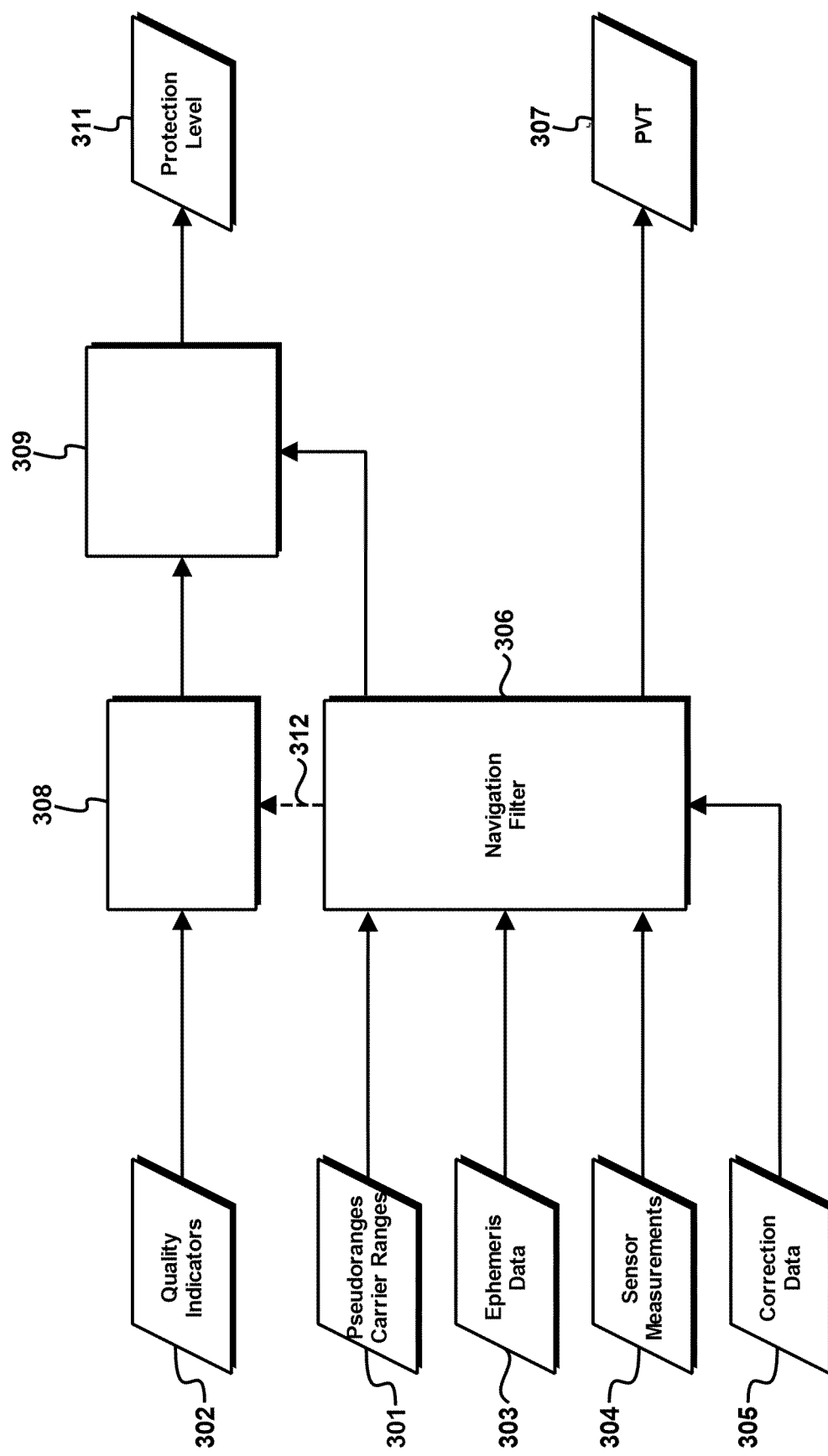
FIG. 3 is a data flow diagram illustrating the calculation of a protection level.

FIG. 3 is a data flow diagram illustrating an exemplary calculation of a protection level carried out in a navigation system installed in a vehicle. In this example, the inputs to the calculation include: pseudoranges and carrier ranges 301 measured by a GNSS receiver which is housed in the vehicle; measurement quality indicators 302; Ephemeris data 303; sensor measurements 304 and satellite correction data 305 relating to the GNSS measurement. The pseudoranges and carrier ranges 301 and ephemeris data 303 are provided to a Navigation Filter 306 together with the sensor measurements 304 (e.g. data provided by an Inertial Navigation System) and correction data 305. The Navigation Filter 306 stores a numerical model for the motion of the vehicle which is updated according to the data provided to it. In one exemplary implementation, the Navigation Filter 306 processes the provided data using a Kalman filter. The Kalman filter may include one or more states for estimating the ambiguity of the carrier range measurements.

As well as storing state data associated with the numerical model, such as the position and velocity of the vehicle, the Navigation Filter 306 also maintains an estimate of the errors in the states. The numerical model includes a set of weighting factors for each state in a gain matrix (defined by a set of gain coefficients) which is used to calculate posterior estimates for each of the stored states, e.g. position, velocity etc. The posterior estimates are obtained by using the gain matrix to form a weighted sum from the current GNSS measurement data 301 and the state parameters based on the previous iteration of the Navigation Filter 306.

The measurement quality indicators 302 are provided as input to a measurement error calculation block 308. The output of the calculation block 308 is a posterior error probability distribution for the measurement error which is conditioned on the provided measurement quality indicators 302. This output can be denoted mathematically by the function $F_{E|P=\bar{p}}(e)$, in which E and P represent random variables for the measurement error and the measurement quality indicators respectively, and e and p are variables denoting particular realisations or values of E and P (i.e. for the conditions applied to the current measurement), with $\bar{p}$ being a vector formed from the input measurement quality indicators 302. The function F (e) is calculated by first calculating a conditional PDF $F_{E|P}(e,p)$ for the measurement errors given the measurement quality indicators 302. This conditional PDF $F_{E|P}(e,p)$ is obtained by normalising or dividing a multivariate PDF between the measurement error and the measurement quality indicators (e.g. obtained using the measurement campaign described with reference to FIG. 1), $F_{E,P}(e,p)$, with a marginal PDF, $F_p(p)$). This marginal PDF is obtained by marginalising $F_{E,P}(e,p)$ with respect to the measurement quality indicators p, i.e. by integrating $F_{E,P}(e,p)$ over all possible values of the measurement error, e. In other words, the conditional PDF $F_{E|P}(e,p)$ is obtained by the application of Bayes' formula to the multivariate PDF between the measurement error and the measurement quality indicators 302

$$F_{E|P}(e, p) = \frac{F_{E,P}(e, p)}{F_P(p)}$$

The function $F_{E|P=\bar{p}}(e)$ is then obtained by evaluating the conditional PDF $F_{E|P}$ (e,p) using the vector $\bar{p}$ formed from the input measurement quality indicators 302.

Although the multivariate PDF $F_{E,P}(e,p)$ has been described as depending on the measurement quality indicators 302, it will be appreciated that the measurement quality indicators P for the multivariate PDF may also include measurement quality indicators derived from the Navigation Filter 306, such as residuals (also known as measurement innovations). The residuals reflect the discrepancy between the predicted measurement $\hat{y}_k$ or $\hat{y}_{k|k-1}$ by the Navigation filter 306 and the actual measurement $y_k$. The predicted measurement may be calculated based on an a priori state estimate giving an "a priori" residual $y_k - \hat{y}_{k|k-1}$. Another method is to compute the residuals after the estimate of the state is updated, i.e. "a posteriori" residual $y_k - \hat{y}_k$. Thus, the measurement quality indicators P may include a posteriori or a priori residual for the position of the vehicle. In this case, the residuals 312 from the Navigation Filter 306 are provided as an additional input to the calculation block 308 (represented by the dashed line in FIG. 3) and are included in the vector of measurement quality indicators, $\bar{p}$ when the conditional PDF $F_{E|P}(e,p)$ is evaluated.

The PDF $F_{E|P=\bar{p}}(e)$ can be converted into a cumulative probability distribution function (CDF) by integration over the measurement error variable, e. Conversely, the CDF can be converted into a PDF by differentiation with respect to the measurement error variable, e. However, as discussed below, the CDF may be more convenient than the equivalent PDF for the calculation of protection levels. Similarly, the multivariate PDF $F_{E,P}(e,p)$ can also be represented as a multivariate CDF, $F_{E,P}(e,p)$, so that, for example, a copula decomposition for the multivariate CDF can be used (e.g. to simplify integration/normalisation of the distribution).

The measurement error PDF conditioned on the measurement quality indicators 302, $F_{E|P=\bar{p}}(e)$, obtained from calculation block 308 is used to estimate the errors in the states estimated in the numerical model used by the Navigation Filter 306. The function $F_{E|P=\bar{p}}(e)$ is transformed into a CDF 309 of the current errors in the states using the gain matrix from the Navigation Filter 306. The current estimate of CDF 309 is used to calculate a protection level (PL) 311 associated with the current position of the vehicle. For a given PL 311, a point on the CDF 309 is located for the probability associated with the integrity risk defined for the PL; the PL is then obtained from the abscissa of the point. In other words, the PL is calculated by evaluating the inverse function of the CDF 309 using the PL probabilities.

Although the measurement quality indicators referred to above may typically be measured using the GNSS receiver, this is not necessarily the case and other forms of sensor may be used to record measurement quality indicators. For example, measurements made by motion sensors such as, gyroscopes, accelerometers and wheel speed sensors, or other sensor systems such as vision systems, may also be used as measurement quality indicators. This may be because, for example, the motion sensor data is correlated with a particular road type which in turn is correlated with a particular measurement quality environment. Consistency information derived from navigation filters may also be used as measurement quality indicators. Other quality indicators that may be used include satellite elevation and satellite azimuth with respect to the body frame of a vehicle.

Signal distortion caused by terrain, vegetation, roadside structures and other vehicles is often time-correlated. The estimation of position errors may therefore be improved in some circumstances by taking into account historical values of measurement quality indicators during the conditioning 202 of the multivariate probability distribution. As the time constants of the time-correlated errors arising from signal distortion may depend on vehicle speed, the speed may be used to determine the weighting given to the historical values, e.g. the speed may be used as normalising factor for scaling the time axis.

Figure 4:
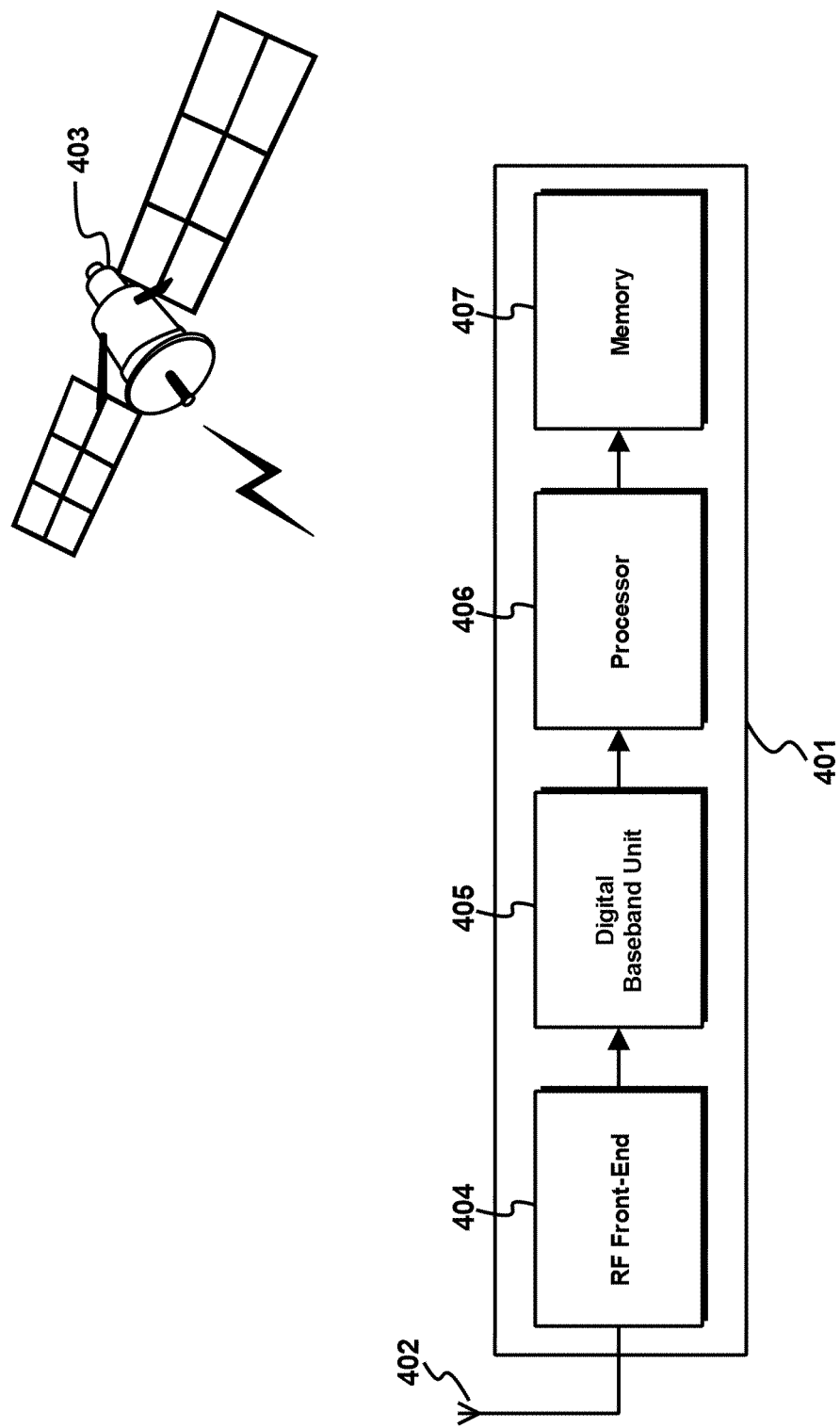
FIG. 4 is a schematic view of a GNSS receiver according to an embodiment of the invention.

FIG. 4 is a schematic view of an exemplary "target" GNSS receiver 401 which can be used to determine a posterior error distribution function for one or more GNSS measurements made by the target receiver 401. The GNSS receiver 401 has an antenna 402, an RF front-end 404, a digital baseband unit 405, a processor 406, and a memory 407. The antenna 402 receives GNSS signals from at least one satellite 403 within the GNSS constellation. These signals are passed to the RF front-end 404 which performs one or more amplification, down-conversion and filtering operations. The RF front-end also digitises the GNSS signals before they are forwarded to the digital baseband unit 405. The digital baseband unit 405 processes the down-converted and digitised GNSS signals in order to provide pseudorange and carrier range GNSS measurements and to determine measurement quality indicators associated with the GNSS signals.

Examples of measurement quality indicators provided by the digital baseband unit 405 include tracking quality information such as carrier-to-noise density and/or variability and lock indicators. The processor 406 receives the GNSS range measurements and the measurement quality indicators from the digital baseband unit 405. In addition to other tasks described herein, the processor 406 may be configured to further process the GNSS range measurements using a navigation filter such as a Kalman filter or a recursive LS filter to provide a navigation solution. The navigation filter may additionally or alternatively provide measurement quality indicators of its own. As discussed previously, residuals from the navigation filter may be used by the processor 406 to condition the multivariate probability distribution. Thus one skilled in the art will appreciate that measurement quality indicators may come from the processor 406 itself in addition or alternatively to those provided by the digital baseband unit 405.

The non-volatile memory 407 stores data representing a multivariate probability distribution between the measurement error of the GNSS receiver and one or more measurement quality indicators. The processor 406 is coupled to the memory 407 in order to access the data representing the multivariate probability distribution model. [The processor may of course use the memory for other purposes, e.g. to store and retrieve execution code.] The processor 406 uses the determined measurement quality indicators to condition the multivariate probability distribution model to obtain a posterior error probability distribution for the GNSS measurement, e.g. using the calculation 308 described above in connection with FIG. 3.

Figure 5:
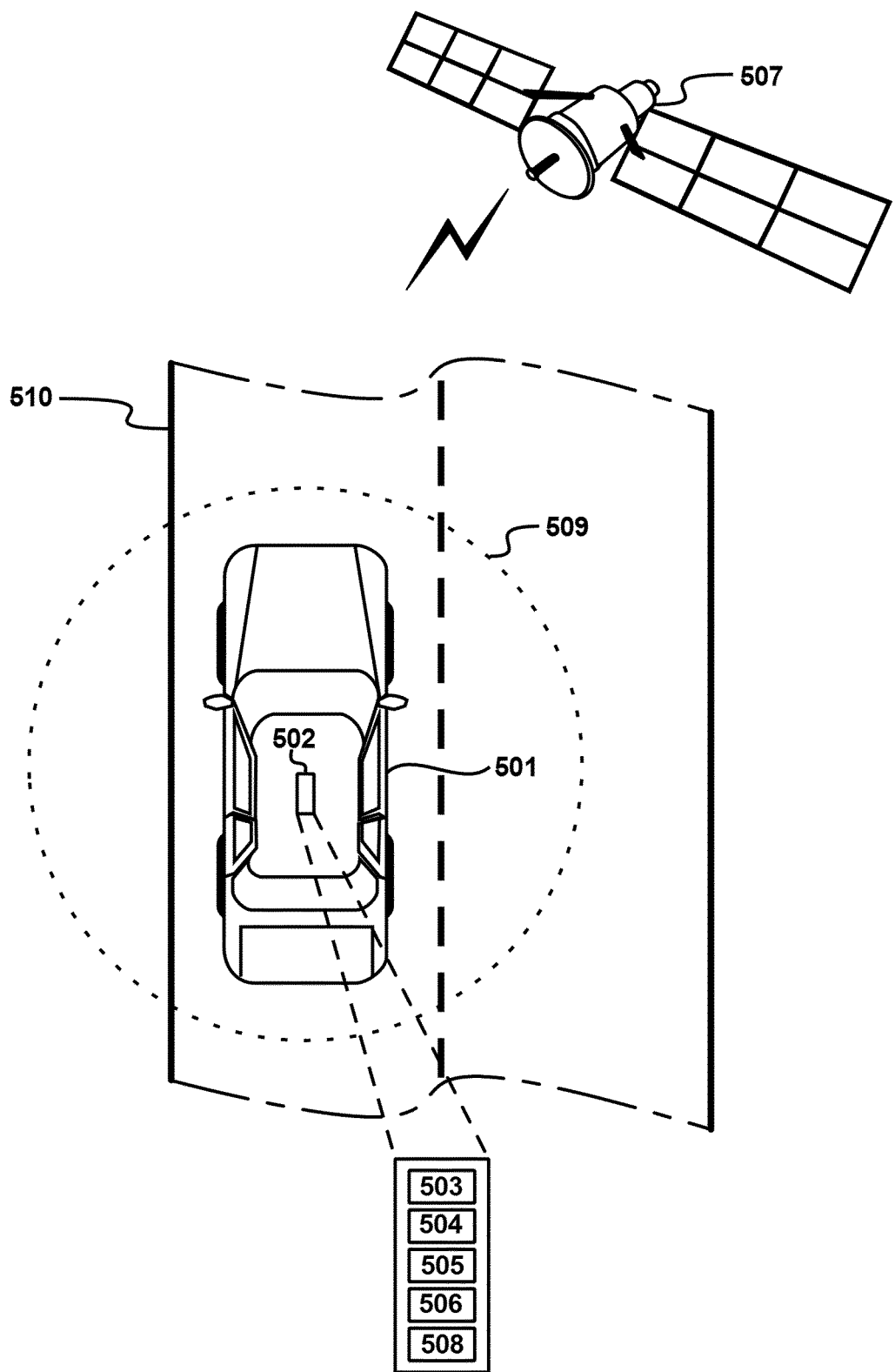
FIG. 5 is a schematic top down view of a road vehicle in which a module for a navigation system is installed according to an embodiment of the invention.

FIG. 5 is a schematic top down view of a road vehicle 501, such as a car, in which an exemplary module 502 for a navigation system is installed. The module 502 may, for example, form part of an ADAS.

The module 502 comprises an interface sub-module 503, a processor 504 and a non-volatile memory 505. It further comprises a GNSS receiver 506 configured to receive GNSS signals from at least one satellite 507 within the GNSS and to perform one or more ranging measurements. The interface sub-module 503 receives the one or more measurements made by the GNSS receiver 506 together with one or more measurement quality indicators. The measurement quality indicator(s) may additionally or alternatively be received from one or more sensors 508 of the module 502, such as a gyroscope, accelerometer or wheel speed sensor. The non-volatile memory 505 stores field data representing a multivariate probability distribution between the measurement error of the GNSS receiver and one or more measurement quality indicators. The field data characterises the statistics of the measurement errors and the one or more measurement quality indicators together with their dependencies and is collected in advance as already described and illustrated in FIG. 1. The processor 504 is coupled to the memory 505 in order to access the data representing the multivariate probability distribution. The processor 504 uses the received measurement quality indicator(s) to condition the multivariate probability distribution model and thereby obtain a posterior error probability distribution for the GNSS measurement.

The posterior error probability distribution generated by the module 502 can be used to estimate a protection level 509 for the position of the road vehicle 501. In the example shown in the figure, a radial protection level is depicted for the protection level 509, but it is of course possible that the protection level 509 is defined differently in different directions, including directions with vertical components as well as horizontal components, e.g. a rectangular protection level.

Although the module 502 has been described with reference to a road vehicle 501, it may also form part of a navigation system for an aircraft or a waterborne craft.

It will be appreciated by the person of skill in the art that various modifications may be made to the above described embodiments without departing from the scope of the invention.

The invention claimed is:

1. A method of determining a posterior error probability distribution for a parameter measured by a Global Navigation Satellite System (GNSS) receiver, the method comprising:
receiving a value for each of one or more GNSS measurement quality indicators associated with the GNSS measurement of the parameter;
inputting each of the received measurement quality indicator values into a multivariate probability distribution model to determine the posterior error probability distribution for the measured GNSS parameter, wherein variates of the multivariate probability distribution model comprise an error for the measured GNSS parameter and the one or more measurement quality indicators, and the multivariate probability distribution model maps the error for the measured GNSS parameter to the one or more measurement quality indicators; and
acquiring, based on the posterior error probability distribution for the measured GNSS parameter, position information of the GNSS receiver to control navigation,
wherein the multivariate probability distribution model is a multivariate probability distribution function, the method further comprising:
marginalizing the multivariate probability distribution function with respect to the one or more measurement quality indicators to obtain a marginal probability distribution function; and
normalizing the multivariate probability distribution function using the marginal probability distribution function to obtain a conditional probability distribution.

2. The method according to claim 1, wherein the one or more of the measurement quality indicators is indicative of signal distortion of one or more GNSS satellite signals received by the GNSS receiver.

3. The method according to claim 1, wherein the one or more of the measurement quality indicators is derived from one or more GNSS satellite signals received by the GNSS receiver.

4. The method according to claim 3, wherein the one or more of the GNSS measurement quality indicators comprises one or more of:
carrier-to-noise density,
carrier-to-noise density variability,
carrier phase variance,
multipath deviation,
loss-of-lock detection,
code lock time and phase lock time,
satellite elevation, and
satellite azimuth.

5. The method according to claim 1, wherein the one or more of the measurement quality indicators is determined from measurements made by one or more sensors.

6. The method according to claim 1, wherein the parameter measured by the GNSS receiver is a GNSS range measurement.

7. The method according to claim 1, wherein the parameter measured by the GNSS receiver comprises one or more of a pseudorange measurement, a Doppler measurement, or a carrier phase measurement.

8. The method according to claim 1, further comprising using the posterior error probability distribution for the measured GNSS parameter to estimate a probability distribution for the uncertainty in a position of the GNSS receiver.

9. A method according to claim 8, further comprising using the posterior error probability distribution for an uncertainty in the position of the GNSS receiver to calculate a protection level.

10. The method according to claim 1, wherein determining the posterior error probability distribution for the measured GNSS parameter comprises using one or more GNSS measurement quality indicators associated with a previous GNSS parameter measurement.

11. A method of obtaining a multivariate probability distribution model, variates of the multivariate probability distribution comprising an error for a parameter measured by a Global Navigation Satellite System (GNSS) receiver and one or more GNSS measurement quality indicators associated with the GNSS measurement of the parameter, the method comprising:
collecting a value for each of the one or more GNSS measurement quality indicators for a plurality of different geographic locations; and
for each geographic location:
receiving a GNSS measurement of the parameter;
receiving a reference measurement of the parameter;

comparing the GNSS measurement of the parameter with the reference measurement of the parameter to obtain an error in the GNSS measurement of the parameter; and determining the multivariate probability distribution model from the GNSS measurement errors and the one or more GNSS measurement quality indicator values, the multivariate probability distribution model mapping the error for the measured GNSS parameter to the one or more GNSS measurement quality indicators, wherein a posterior error probability distribution for the measured GNSS parameter, which is determined by inputting values of the one or more GNSS measurement quality indicators to the multivariate probability model, is used to acquire position information of the GNSS receiver to control navigation, wherein the multivariate probability distribution model is a multivariate probability distribution function, the method further comprising:

marginalizing the multivariate probability distribution function with respect to the one or more measurement quality indicators to obtain a marginal probability distribution function; and normalizing the multivariate probability distribution function using the marginal probability distribution function to obtain a conditional probability distribution.

12. The method according to claim 11, wherein the GNSS receiver is attached to or housed within a vehicle.

13. A navigation system comprising:
an interface for receiving a value for each of one or more measurement quality indicators associated with a parameter measured by a Global Navigation Satellite System (GNSS) receiver;

a memory storing a multivariate probability distribution model, variates of the multivariate probability distribution comprising an error for the measured GNSS parameter and each of the one or more GNSS measurement quality indicators, and the multivariate probability distribution model mapping the error for the measured GNSS parameter to the one or more GNSS measurement quality indicators; and a processor coupled to the memory and the interface, the processor configured to determine a posterior error probability distribution for the measured GNSS parameter by inputting each of the received measurement quality indicator values into the multivariate probability distribution model, the processor further configured to acquire, based on the posterior error probability distribution for the measured GNSS parameter, position information of the GNSS receiver to control navigation, wherein the multivariate probability distribution model is a multivariate probability distribution function, the processor configured to further perform:

marginalizing the multivariate probability distribution function with respect to the one or more measurement quality indicators to obtain a marginal probability distribution function; and normalizing the multivariate probability distribution function using the marginal probability distribution function to obtain a conditional probability distribution.

14. The navigation system according to claim 13, wherein the multivariate probability distribution model stored in the memory is obtained by the processor configured to further perform:

collecting a value for each of the one or more GNSS measurement quality indicators for a plurality of different geographic locations; and for each geographic location:
receiving a GNSS measurement of the parameter;
receiving a reference measurement of the parameter;
comparing the GNSS measurement of the parameter with the reference measurement of the parameter to obtain an error in the GNSS measurement of the parameter; and determining the multivariate probability distribution model from the GNSS measurement errors and the GNSS measurement quality indicator values.

15. The navigation system according to claim 14, wherein the GNSS receiver is attached to or housed within a vehicle.

16. A non-transitory computer-readable medium storing instructions that are executable by one or more processors of an apparatus to perform a method of determining a posterior error probability distribution for a parameter measured by a Global Navigation Satellite System (GNSS) receiver, the method comprising:

receiving a value for each of one or more GNSS measurement quality indicators associated with the GNSS measurement of the parameter;

inputting each of the received measurement quality indicator values into a multivariate probability distribution model to determine the posterior error probability distribution for the measured GNSS parameter, wherein variates of the multivariate probability distribution model comprise an error for the measured GNSS parameter and the one or more measurement quality indicators, and the multivariate probability distribution model maps the error for the measured GNSS parameter to the one or more measurement quality indicators; and acquiring, based on the posterior error probability distribution for the measured GNSS parameter, position information of the GNSS receiver to control navigation, wherein the multivariate probability distribution model is a multivariate probability distribution function, the method further comprising:

marginalizing the multivariate probability distribution function with respect to the one or more measurement quality indicators to obtain a marginal probability distribution function; and normalizing the multivariate probability distribution function using the marginal probability distribution function to obtain a conditional probability distribution.

17. A non-transitory computer-readable medium storing instructions that are executable by one or more processors of an apparatus to perform a method of obtaining a multivariate probability distribution model, variates of the multivariate probability distribution comprising an error for a parameter measured by a Global Navigation Satellite System (GNSS) receiver and one or more GNSS measurement quality indicators associated with the GNSS measurement of the parameter, the method comprising:

collecting a value for each of the one or more GNSS measurement quality indicators for a plurality of different geographic locations; and for each geographic location:
receiving a GNSS measurement of the parameter;
receiving a reference measurement of the parameter;

comparing the GNSS measurement of the parameter with the reference measurement of the parameter to obtain an error in the GNSS measurement of the parameter; and determining the multivariate probability distribution model from the GNSS measurement errors and the one or more GNSS measurement quality indicator values, the multivariate probability distribution model mapping the error for the measured GNSS parameter to the one or more GNSS measurement quality indicators, wherein a posterior error probability distribution for the measured GNSS parameter, which is determined by inputting values of the one or more GNSS measurement quality indicators to the multivariate probability distribution model, is used to acquire position information of the GNSS receiver to control navigation, wherein the multivariate probability distribution model is a multivariate probability distribution function, the method further comprising:

marginalizing the multivariate probability distribution function with respect to the one or more measurement quality indicators to obtain a marginal probability distribution function; and normalizing the multivariate probability distribution function using the marginal probability distribution function to obtain a conditional probability distribution.

18. The method according to claim 1, wherein the GNSS receiver is attached to or housed within a vehicle.

\* \* \* \* \*